(12) United States Patent
Bernhardt

(10) Patent No.: US 12,006,069 B2
(45) Date of Patent: Jun. 11, 2024

(54) ROCKET EXHAUST DRIVEN AMPLIFICATION (REDA) OF VLF WAVES IN SPACE

(71) Applicant: The Government of the United States of America, as represented by the Secretary of the Navy, Arlington, VA (US)

(72) Inventor: Paul A. Bernhardt, Alexandria, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 151 days.

(21) Appl. No.: 17/547,457

(22) Filed: Dec. 10, 2021

(65) Prior Publication Data
US 2022/0185507 A1    Jun. 16, 2022

Related U.S. Application Data

(60) Provisional application No. 63/125,525, filed on Dec. 15, 2020.

(51) Int. Cl.
*B64G 1/40*    (2006.01)
*B64G 1/24*    (2006.01)
(Continued)

(52) U.S. Cl.
CPC ............ *B64G 1/405* (2013.01); *B64G 1/242* (2013.01); *B64G 1/54* (2013.01); *F03H 1/0081* (2013.01);
(Continued)

(58) Field of Classification Search
CPC ...................................................... B64G 1/405
See application file for complete search history.

(56) References Cited

U.S. PATENT DOCUMENTS 9,527,608 B1 * 12/2016 Sotnikov .................. B64G 1/66

OTHER PUBLICATIONS

Manufacturing Group "Aerojet Rocketdyne engines boost Antares rocket" (Year: 2014).*

(Continued)

*Primary Examiner* — Arun Goyal
*Assistant Examiner* — William L Breazeal
(74) *Attorney, Agent, or Firm* — US Naval Research Laboratory; Suresh Koshy

(57) ABSTRACT

A method and apparatus uses a VLF transmitter, a VLF receiver, and/or a low earth orbit satellite including a rocket engine. A VLF wave transmitted into space is converted to an ambient wave. The ambient wave acts as a signal wave for a whistler traveling wave parametric amplifier. Rocket exhaust is generated in atmospheric plasma. The rocket exhaust includes kinetic energy acting as a Lower Hybrid wave source. The Lower Hybrid wave source produces a Lower Hybrid wave, which acts as a pump wave for the parametric amplifier. Nonlinear mixing of the signal wave and the pump wave in the atmospheric plasma simultaneously parametrically amplifies the ambient wave and generates an idler wave and a parametrically amplified wave. The parametrically amplified wave (1) reduces the density of energetic protons or killer electrons in the Van Allen radiation belt, and (2) improves communications between the VLF transmitter and VLF receiver.

13 Claims, 7 Drawing Sheets

(51) Int. Cl.
  *B64G 1/54* (2006.01)
  *F03H 1/00* (2006.01)
  *H05H 1/46* (2006.01)

(52) U.S. Cl.
  CPC ......... *F03H 1/0087* (2013.01); *H05H 1/4645* (2021.05)

(56) References Cited

OTHER PUBLICATIONS

Wikipedia "International Space Station" (Year: 2020).*
Eliasson et al., Numerical study of mode conversion between lower hybrid and whistler waves on short-scale density striations, Journal of Geophysical Research, 2008, pp. 1-7, vol. 113, Issue A9, A09315, doi:10.1029/2008JA013261, American Geophysical Union, Washington, DC, USA.
Camporeale et al., Lower hybrid to whistler mode conversion on a density striation, Journal of Geophysical Research, 2012, pp. 1-16, vol. 117, Issue A10, A10315, doi:10.1029/2012JA017726, American Geophysical Union, Washington, DC, USA.
Winske et al., Generation of lower hybrid and whistler waves by an ion velocity ring distribution, Physics of Plasmas, Jul. 16, 2021, pp. 072109-1-072109-17, vol. 19, Issue 7, https://doi.org/10.1063/1.4736983, American Institute of Physics (AIP), College Park, MD, USA.
Bernhardt, A Critical Comparison of Ionospheric Depletion Chemicals, Journal of Geophysical Research, May 1, 1987, pp. 4617-4628, vol. 92, No. A5, American Geophysical Union, Washington, DC, USA.
Kumar et al., Parametric conversion of a lower hybrid wave into a whistler in a plasma, Physics of Plasmas, May 27, 2008, pp. 052107-1-052107-4, vol. 15, Issue 5, https://doi.org/10.1063/1.2918343. American Institute of Physics (AIP), College Park, MD, USA.

* cited by examiner

ROCKET EXHAUST DRIVEN AMPLIFICATION (REDA) OF VLF WAVES IN SPACE

CROSS-REFERENCE TO RELATED APPLICATIONS

The present application claims priority to U.S. Provisional Patent Application Ser. No. 62/125,525, which was filed on 15 Dec. 2020 and is incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing NC 108858-US2.

BACKGROUND OF THE INVENTION

Field of the Invention

This invention relates generally to parametric amplifiers and more particularly to parametric amplifiers for use in over-the-horizon communication and/or detection of subsurface structures or materials.

Description of the Related Art

The natural and artificial production of high intensity whistler waves in space is of interest because their interaction with radiation belt particles. Lighting bursts excite large amplitude pulses of electromagnetic radiation that couple through the bottom of the ionosphere, are ducted along magnetic field lines, and interact with the earth's radiation belts to produce lightning-induced electron precipitation ("LEP"). In this interaction process, amplified whistlers, triggered emissions, and enhancements in the electron density of the lower ionosphere have been observed. Similarly, ground very low frequency ("VLF") transmissions from terrestrial power lines and high power Navy communications systems have also interacted with energetic electrons found in the earth's magnetosphere. Several manmade facilities have been developed to study this wave-particle-interaction ("WPI") process including dedicated VLF transmitters, high-power high frequency ("HF") facilities for modulations of natural ionosphere currents in the ionosphere, large satellite antennas with driven by high power signal generators, electron beams that are modulated at VLF rates, and high speed neutral injections that rapidly photoionize in sunlight. All of these techniques require dedicated, expensive engineering efforts for design, construction, and testing before they are deployed on the ground or in space.

Extremely low frequency ("ELF") and VLF wave-generation processes in space and on the ground have been investigated for over four decades. Whistler modes that propagate in the ionosphere and magnetosphere have been excited by ground based transmitters, the world's high power VLF navigation transmitters, and the high power HF facilities in Arecibo, Puerto Rico; HAARP, Alaska; and Tromso, Norway, or modulation of energetic electron beams on the Space Shuttle. Three current experimental efforts for space-based VLF wave generation are supported in the United States by (1) the Air Force Research Laboratory ("AFRL") with the Demonstration and Science Experiments ("DSX") large dipole antenna to transmit VLF waves in space, (2) the Los Alamos National Laboratory with a VLF precipitation experiment to launch the Beam Plasma Interactions Experiment ("Beam-PIE") with electron beam generation on a sounding rocket, and (3) the Naval Research Laboratory with an injection of 1.5 kg of barium to form hypersonic ions that are converted into lower-hybrid, whistler or magnetosonic waves. Alternate techniques for whistler mode generation are being studied because these waves are difficult to radiate with conventional antennas, where the free space wavelengths (10-1000 km) are so much longer than a practically realizable vertical monopole antenna, and the radiation efficiency is exceedingly small.

The VLF wave sources are expensive in terms of ground facility or spacecraft launch and maintenance costs. There is an on-going debate over which system has the most efficiency. Engineering design and state-of-the-art innovation for these systems adds both cost and risk to each system. In addition, each space-based device has built-in inefficiencies that increase both launch and design costs. The radio frequency ("RF") driven-antenna-in-space concept implemented with the AFRL DSX requires extremely large currents (for a loop antenna) or extremely large voltages (for dipole antennas) because VLF waves cannot be efficiently excited with wavelengths much larger than the physical devices. The Beam-PIE system requires flying a particle accelerator with only a fraction of the payload mass devoted to the electron beam itself. Finally, the ion beam chemical release of barium uses thermite vaporization system that is typically ten-times more massive that the amount of barium gas released.

BRIEF SUMMARY OF THE INVENTION

An embodiment of the rocket exhaust driven amplification ("REDA") invention described herein uses existing technologies to amplify signals from existing ground transmitters with currently available rocket motors in low-earth-orbit. The technique converts the ambient atomic oxygen ion in the topside ionosphere to an activated plasma region with pickup ions gyrating around the magnetic field lines. Whistler waves passing though this region are parametrically amplified by converting the energy of the gyrating ions into intense electromagnetic signals.

An embodiment of the invention includes a simple, low-cost alternate to conventional approaches, where space-plasma medium is converted to an amplifier (as opposed to a generator) of large-amplitude VLF waves in the ionosphere. These amplified waves propagate to the magnetosphere as left-hand circularly polarized whistlers. The instant approach thus converts the earth's plasma medium into a whistler mode amplifier. This work demonstrates that a large area region in space can greatly enhance the amplitude of whistler waves from either ground-based or space-based sources. A VLF wave generation system according to an embodiment of the invention includes (1) a localized VLF wave exciter or generator or transmitter on the ground or in space, (2) a high-gain amplifier involving an efficient chemical injection that is distributed through the medium of space, and finally (3) the radiation belt region where further amplification can occur along with the generation of broad-band noise by interaction with radiation belt electrons. In an embodiment of the invention, neutral gas jets from a rocket motor can form a large-area amplification region in space. The process of rocket exhaust driven amplification for coherent VLF waves employ hypersonic molecules from exhaust jets to charge exchange in the ionosphere yielding gyrating ion beams. These beams transfer energy to whistler mode waves for extremely strong amplification. The amplifier acts for a finite period (on the order of minutes) to inject intense VLF waves along magnetic field lines into the magnetosphere. Wave amplification should accompany scattering of the radiation belt population into the loss-cone through a process called chemical-release-induced electron precipitation ("cep").

DETAILED DESCRIPTION OF THE INVENTION

Figure 1:
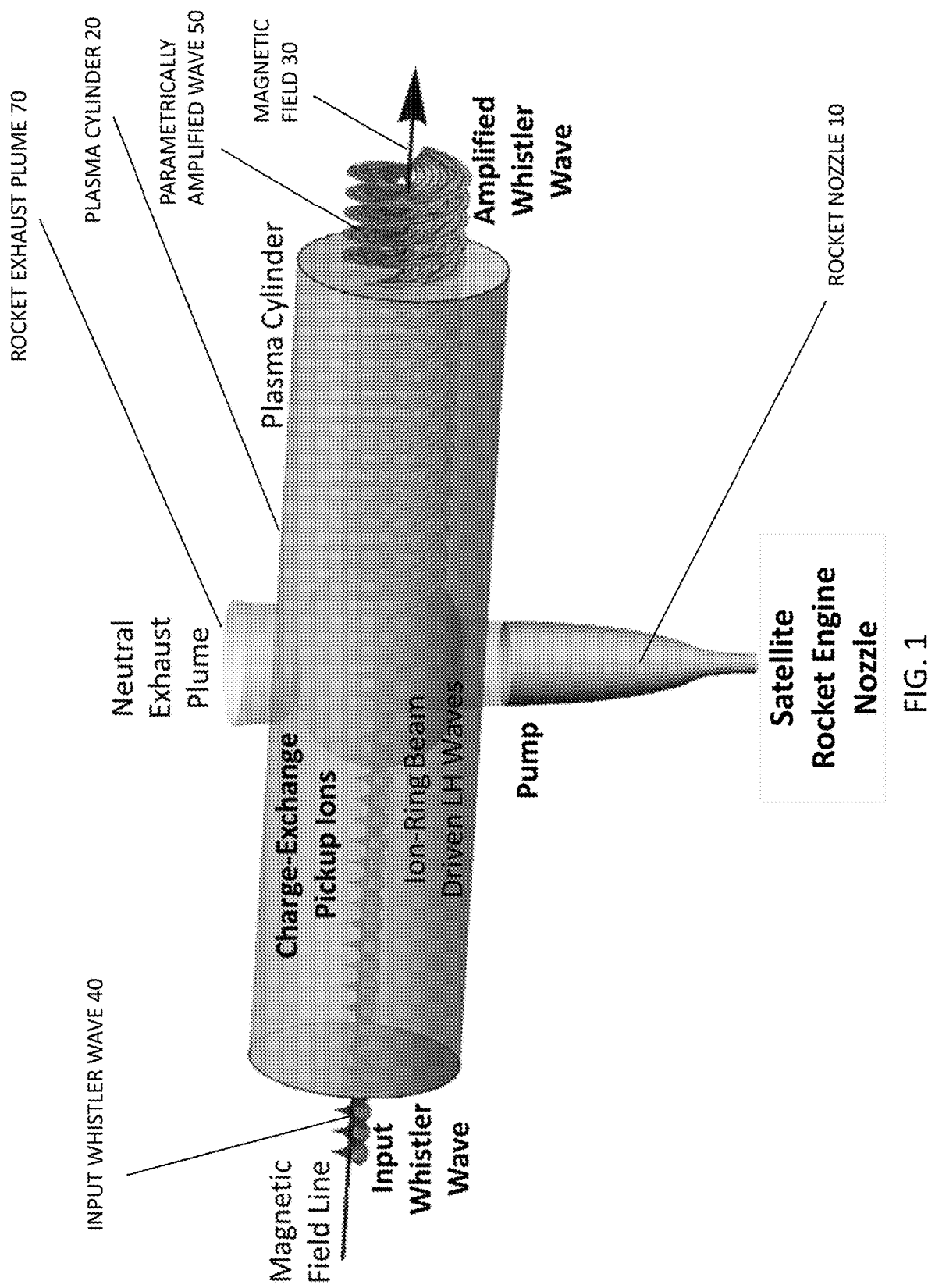
FIG. 1 is a conceptual engineering model of an embodiment of instant invention, wherein the amplitude of the right hand circular polarization is represented as a spiral with growth after passing though the activated region with the ion-ring beam distribution.

An embodiment of the instant invention employs a novel model for a whistler traveling wave parametric amplifier ("WTWPA") that can explain the observed intensification of the VLF waves. Whistler wave production has been previously discussed in terms of conversion from Lower Hybrid waves instead of amplification, as is the focus of this specification. One basic mechanism for generation of whistler waves from ring-beam driven, Lower Hybrid ("LH") waves is mode conversion on electron density striations. Linear conversion process with field-aligned irregularities ("FAI") is discussed in E. Eliasson and K. Papadopoulos, Numerical Study of Mode Conversion between Lower Hybrid and Whistler Waves on Short-Scale Density Striations, *J. Geophys. Res.*, vol. 113, A09315, 2008, incorporated herein by reference, as well as E. Camporeale, E., G. L. Delzanno, and P. Colestock, Lower Hybrid to Whistler Mode Conversion on a Density Striation, *J. Geophys. Res.*, vol. 117, A10315, 2012, incorporated herein by reference. The formation of FAI by the ion ring instability is employed in the REDA. In addition, the mode conversion process does not have the wave feedback needed to provide amplification of an existing whistler signal. The parametric decay process to generate whistlers with different pump waves is well understood by those of ordinary skill in the art (1) for LH decaying to whistler and LH; (2) for LH decay to whistler and ion cyclotron (IC); (3) for decay of IA to whistler and IA; (4) for parametric EM wave pumping, and (5) for an antenna driving two electrostatic waves with frequencies above and below the LH frequency.

To amplify whistlers, a generic whistler traveling wave parametric amplifier ("WTWPA") can be based on a parametric conversion process by which an electrostatic pump wave decays into a whistler wave and another daughter electrostatic wave. The parametric decay process translates into a parametric amplification process by the nonlinear ponderomotive interactions between the two oblique electrostatic waves (i.e., the pump wave and the idler wave) that mix to term oscillating currents to drive a parallel whistler wave. The electrostatic pump mixes with the whistler to sustain the idler wave. The dispersion relation associated with this process can be treated as an absolute instability to generate whistlers at a fixed location or it be considered a convective instability with a complex spatial wavenumber that has an amplifying solution for propagation through the device.

The parametric conversion of beam driven Lower Hybrid waves into whistler wave is a prime candidate for whistler parametric amplification. The electrostatic pump wave is generated by ion-ring beams from charge exchange of neutral exhaust with ambient ions in the ionosphere. Depending on the orientation of the rocket nozzle producing the supersonic neutral plume, a fraction of the charge-exchange beam will be directed along the magnetic field lines and a fraction will form a ring-beam distribution for ions gyrating around magnetic vector B. The longitudinal ion beam will excite ion acoustic ("IA") waves and the perpendicular ion beam will generate Lower Hybrid ("LH") waves. Generation of Lower Hybrid and whistler waves by an ion velocity ring distribution, *Phys. Plasmas*, vol. 19, 072109, pp. 1-17, 2012, incorporated herein by reference, study the generation of whistler waves during the growth and saturation of Lower Hybrid waves excited by the ring velocity distribution. With a 3-D electromagnetic simulation, they employ the LH wave driven by the ion ring distribution to model (1) the interaction coupling of two opposite oblique LH waves into a whistler or (2) the decay of an oblique LH wave into a perpendicular LH wave and a parallel whistler wave. P. Kumar and V. K. Tripathi, Parametric Conversion of a Lower Hybrid Wave into a Whistler in a Plasma, *Phys. Plasmas*, vol. 15, 052107, pp. 1-4, 2008, incorporated herein by reference, examine the parametric decay process of an arbitrary pump LH wave into a daughter LH wave and the desired parallel whistler wave.

In an embodiment of the invention, an ion ring driven LH wave can satisfy the required matching conditions to excite parametrically a daughter LH and oblique whistler in the same non-Maxwellian plasma environment. The following description of an embodiment of the invention focuses on a convective rather than absolute instability under identical conditions. The goal is to recast a parametric conversion process into a parametric amplification process by reinterpretation of the nonlinear dispersion relation of the WTWPA system.

The Rocket Exhaust Driven Amplification ("REDA") Concept

A conceptual engineering model of the REDA is illustrated in FIG. 1. Rocket nozzle 10 injects molecules that rapidly charge exchange with the atomic ions in a plasma cylinder 20. These ions acquire the speed of the neutral gas hut are restricted by the Lorentz force gyrate around the background lines of magnetic field 30. Energy from the gyrating ions is transferred to an input whistler wave 40 causing amplification thereof, thereby generating amplified whistler wave 50.

Several processes transfer energy from the ion motion to the electromagnetic waves. Lower hybrid ("LH") waves are easily excited by the gyrating ions by an ion ring instability. Electrostatic LH waves primarily propagate perpendicular to the magnetic field. Those with a finite, but small wave vector component along the magnetic field can excite whistler waves by mode conversion along field-aligned density striations. Such processes require field aligned irregularities ("FAIs") which requires additional energy for production. The theory of parametric instabilities in the Lower Hybrid frequency region has been formulated using the drift kinetic equation for both fluid and kinetic regimes. The kinetic approach invokes nonlinear Landau damping. One of ordinary skill in the art will readily appreciate that FAIs are not required in one or more embodiments of the instant invention.

A process of transfer energy from the ion motion to the electromagnetic waves that does not require field-aligned irregularities or nonlinear wave scattering is parametric decay of the oblique, finite $k_z$, Lower Hybrid waves to a whistler plus an additional Lower Hybrid waves to satisfy matching conditions. This process will be the basis for parametric amplification of parallel and oblique whistlers with a LH wave pump and does not require field aligned irregularities.

Figure 2:
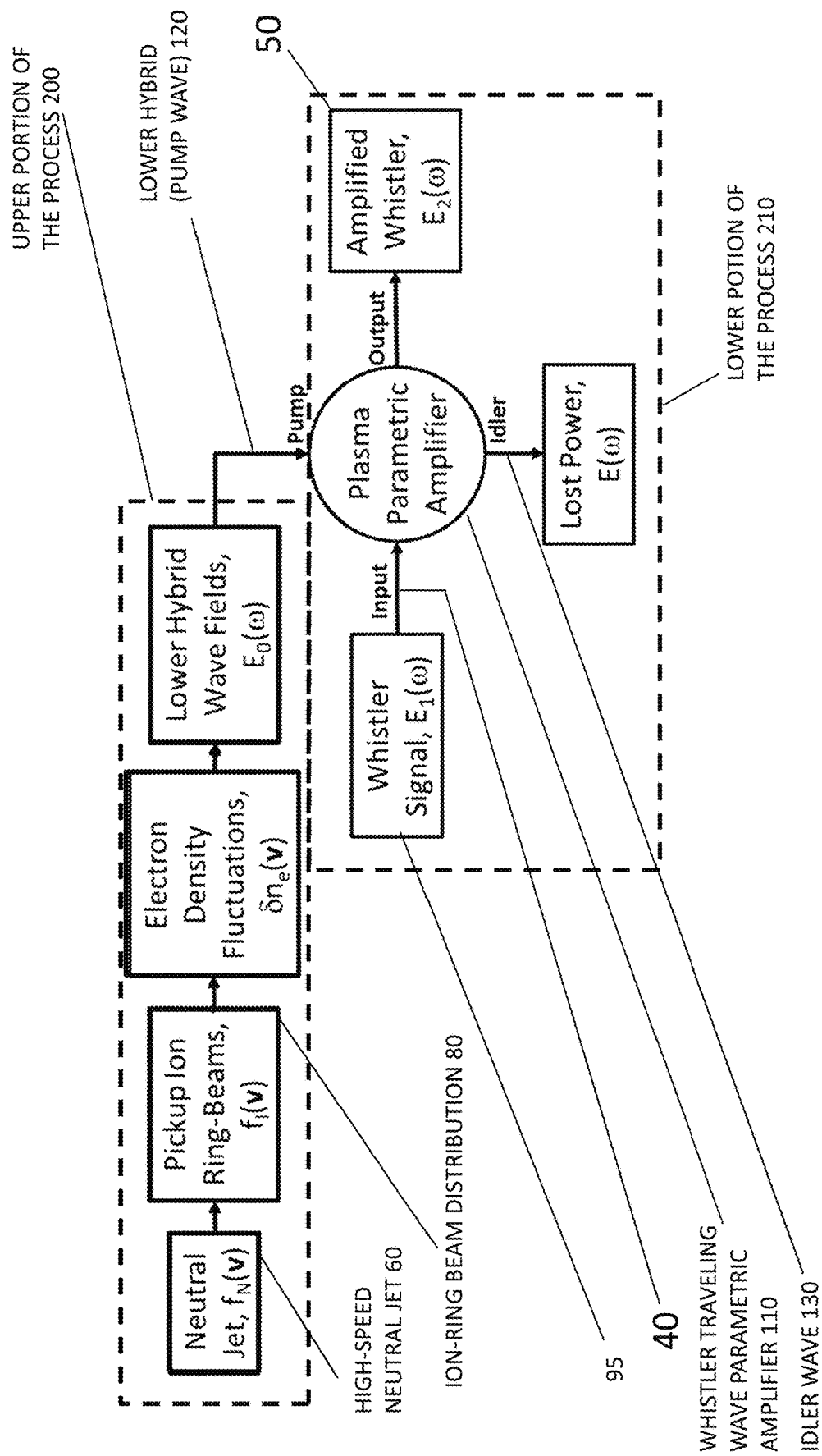
FIG. 2 is a block diagram of a model of whistler wave amplification by neutral injections from rocket burns in space, consistent with an embodiment of the instant invention, an upper portion providing Lower Hybrid wave generation and a lower portion providing amplification.

A block diagram of the REDA process according to an embodiment of the instant invention is illustrated in FIG. 2, wherein an upper portion 200 of the process provides Lower Hybrid wave generation and a lower portion 210 of the process provides amplification. For the excitation of Lower Hybrid waves by a high-speed neutral jet 60 of rocket exhaust plume 70, the kinetic distribution of neutrals is converted into an ion-ring beam distribution 80 by ion-molecular charge exchange. The energetic chemistry for supersonic exhaust production involves burning nitrogen tetroxide and hydrazine fuel to produce molecules of nitrogen and water vapor moving at 3.2 km/s from the nozzle of the rocket motor. In the upper atmosphere, these molecules react with the ambient atomic oxygen ion yielding supersonic ions of water vapor and nitric oxide. A simplified set of exothermic reactions for this process is $$N_2O_4 + 2N_2H_4 \rightarrow 4H_2O^* + 3N^*_2 + 10.9 \text{ eV}$$
$$k_{N_2O_4-N_2H_4} = 1.0 \times 10^{-14} \text{ cm}^3\text{s}^{-1}$$

$$H_2O^* + O^+ \rightarrow H_2O^{+*} + O + 1.10 \text{ eV}, k_{O^+-H_2O} = 3.2 \times 10^{-9} \text{ cm}^3\text{s}^{-1}$$

$$N^*_2 + O^+ \rightarrow NO^{+*} + N + 1.10 \text{ eV } k_{O^+-N_2} = 1.1 \times 10^{-12} \text{ cm}^3\text{s}^{-1} \quad (1)$$

Neglecting transport, the density of activated ring-ions, $n_r$, is estimated with a steady state solution of the rate equation $$\frac{\partial n_r}{\partial t} = k_{CE} n_{H_2O} n_{O^+} - k_{DR} n_r n_{e^-} \quad (2)$$
$$= 0, n_{e^-}$$
$$= n_r + n_{O^-}, n_r$$
$$= \frac{k_{CE} n_{e^-} n_{H_2O}}{k_{DR} n_{e^-} + k_{CE} n_{H_2O}}$$

where the values for the charge exchange rate $k_{CE} = 3.2 \times 10^{-9}$ cm³/s from (1) and dissociative recombination rate $k_{DR} = 3.6 \times 10^{-7}$ cm³/s are given by P. A. Bernhardt, A critical comparison of ionospheric depletions chemicals, *Journal of Geophysical Research*, vol. 92(A5), pp. 4617-4628, 1987, incorporated herein by reference. The equilibrium ring-ion density is related to the conversion of neutral kinetic energy to pump LH wave energy by a constant fraction $\alpha_S$ given by $$\alpha_C = \frac{n_r}{n_{H_2O}} \quad (3)$$
$$= \frac{k_{CE} n_{e^-}}{k_{DR} n_{e^-} + k_{CE} n_{H_2O}}, W_{rS}$$
$$= \frac{1}{2} m_r V_r^2 \alpha_C n_{H_2O}, \alpha_S$$
$$= \frac{W_{0S}}{W_{rS}}$$

where $\alpha_C$ is the charge-exchange, conversion efficiency, $W_{rS}$ is the water-ion, source energy, and $W_{0S}$ is the electrostatic energy of the LH wave. For example, $\alpha_C = 0.0088$ and $W_{rS} = 2.45 \times 10^{-10}$ J/m³.

The fraction of activated ions is

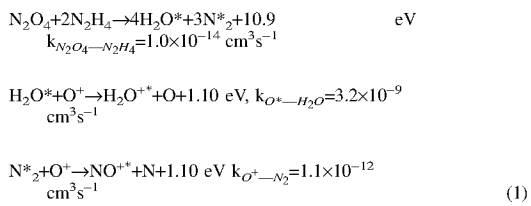

This is a critical parameter for driving the REDA process in the plasma. This fraction is computed using the time dependent model described by, P. A. Bernhardt e al., "Strong amplification of ELF/VLF signals in space using neutral gas injections from a satellite rocket engine," in *Radio Science*, vol. 56, no. 2 pp. 1-18, February 2021, doi: 10.1029/2020RS007207, incorporated herein by reference, which couples the neutral expansion of the exhaust cloud with the background plasma using the chemical reactions from (1). This plasma profile is taken one second after the burn stops along the magnetic field line at the burn termination point, but it is representative of the density of activated ions ~7 km behind, for example, a Cygnus satellite with, for example, a BT-4 pressure-fed liquid rocket engine during the full 60 seconds of the burn. This illustrative BT-4 rocket engine burns MMH/$N_2O_4$ with a thrust of 450 N. The ion-ring distribution has an activation fraction of about 30% in a region with a full width of about 25 km. Amplification occurs for whistler mode waves passing through this region by the WTWPA process.

There are three methods for detection of the ion ring distribution of $H_2O^+$ molecules. First, ground incoherent scatter radar ("ISR") can measure the ion line spectra with the radar beam pointed at the exhaust cloud in the plasma. The ISR technique provided confirmation of ion-ring generation. The second technique is in situ measurements of the ion velocity distribution on a satellite with an ion-drift meter. The presence of the artificial, fast ions was detected by both ion plasma drift and composition measurements. The third technique is observations of residual plasma hole in the ionosphere after the molecular ions in the ring distribution have recombined with ambient electrons.

According to the instant invention, a rocket motor injecting neutral molecules across magnetic field lines in the ionosphere creates an ion-ring distribution. The generation of Lower Hybrid waves is the next step in the REDA process and is discussed in the next section.

Lower Hybrid Wave Generation

Lower hybrid pump waves are generated in a low-beta plasma by an ion-velocity ring distribution. Modeling of this process requires both linear theory for wave growth and kinetic simulations in two or three spatial dimensions. The plasma velocity distribution models for the ambient electrons, background ions, cold ring-beam ions, and warm ring-beam ions, are the following respectively.

$$f_e^b(v) = \frac{1}{\pi^{3/2} v_e^3} \exp\left(-\frac{v^2}{v_e^2}\right), \tag{4}$$

$$f_i^b(v_\perp, v_\parallel) = \frac{1}{\pi^{3/2} v_{i\perp}^2 v_{i\parallel}} \exp\left(-\frac{v_\perp^2}{v_{i\perp}^2} - \frac{v_\parallel^2}{v_{i\parallel}^2}\right),$$

$$f_i^r(v_\perp, v_\parallel) = \frac{1}{2\pi u_{m\perp}} \delta(v_\perp - V_r)\delta(v_\parallel - V_z),$$

$$f_i^r(v_\perp, v_\parallel) = \frac{1}{(2\pi v_m^2)^{3/2}} \exp\left[-\frac{(v_\parallel - V_z)^2 + v_\perp^2 + V_r^2}{2v_m^2}\right] I_0\left(\frac{v_\perp V_r}{v_m^2}\right)$$

Representative experimental parameters for these distributions are given as electron thermal speed $v_e \approx 100$ km/s, ion perpendicular and parallel thermal speed $v_{i\perp} \approx v_{i\parallel} \approx 1$ km/s, ion ring velocity $V_r \approx 4$ km/s, ion beam parallel velocity $V_z \approx 1$ km/s, and ion ring beam thermal speed $v_m \approx 0.1$ km/s for a retrograde (i.e., wake) Cygnus engine burn that subtracts the exhaust speed from the satellite orbit motion.

Representative plasma velocity distributions include a broad velocity space spectrum of electrons, a warm spectrum of background ions and a cold spectrum of pickup ions produced from the cold but swift neutral atoms from by the rocket motor. These kinetic distribution functions can be used to derive the electrostatic linear dispersion equation for Lower Hybrid waves driven by the ring distribution. Because rocket exhaust and created pickup ions are cold, the dispersion equation for the LH waves is derived using the $3^{rd}$ (rather than $4^{th}$) ring distribution function in (4).

The electrostatic wave dispersion function can be derived from fluid theory using Poisson's Equation, the linearized equations of motion, and the equations of continuity for the electrons and ions. For the ring ion distribution, the generalized dispersion formulation employs the following integrations for relating pump density $n_{0i}$ and electric potential $\Phi_{0i}$ oscillations.

$$\frac{e}{\varepsilon_0} n_{0t} = \phi_{0i} \omega_{pt}^2 \int_{-\infty}^{0} dt e^{-i\omega t} \int_0^\infty v_\perp dv_\perp \int_0^\infty dv_\parallel \int_0^{2\pi} d\theta \exp(ik_0 \cdot vt) k_0 \cdot \nabla_{vf} f$$

Substitution of the first three distributions of (4) in Poisson's equation yield the Lower Hybrid dispersion $$D_{LH}^{ES}(\omega_0, \alpha) = \tag{6}$$

$$1 + \frac{\omega_{pe}^2}{\omega_{ce}^2} - \frac{\omega_{pe}^2 k_{0z}^2}{\omega_0^2 k_0^2} - (1-\alpha)\frac{\omega_{pi}^2}{\omega_0^2} - \alpha \frac{m_i}{m_r} \frac{\omega_{pi}^2 \omega_0}{(\omega_0^2 - k_{0z}^2 V_r^2)^{3/2}} = 0$$

where $\alpha$ is the fraction of total ions in a velocity ring, $V_r$ is the perpendicular ion speed, $m_r$ and $m_i$ are the respective ring and background ion masses, $\omega_0$ is the Lower Hybrid frequency for the pump wave, $k_{0x}=k_0 \sin \theta_0$ is the perpendicular wave number, $k_{0z}=k_0 \cos \theta_0$ is the parallel wave number, $\theta_0$ is the wave vector angle with magnetic vector B, and $\omega_i^2 = n_i e^2/(m_i \varepsilon_0)$, $\omega_{pe}^2 = n_{e0} e^2/(m_e \varepsilon_0)$ and $\omega_{ce} = eB/m_e$ are the ion-plasma, electron-plasma and electron-cyclotron frequencies, respectively.

Numerical solutions of (5) give the LH wave frequency, $\omega_0$ and growth rates, $\gamma_0$ of the LH wave instability for a range of wave numbers, $k_0$ and wave propagation angles, $\theta_0$. Such numerical solutions of the LH wave dispersion equation with 10% of the ions in a ring velocity distribution indicate that maximum LH instability growth is found for propagation nearly perpendicular to magnetic vector B. Away from cyclotron resonance, the wave growth vanishes and the LH wave dispersion is for a Maxwellian plasma composed of background and pick ion masses $m_i$ and $m_r$, respectively. At the cyclotron resonance region, the LH wave eigenvalues for resonant frequency and growth rate change significantly.

For each LH wave propagation direction, the numerical values of perpendicular wave number are given by the cyclotron resonance formulas $$\omega_0 \approx \omega_{ce} \cos\theta_0 \text{ and } k_{0x} \approx \frac{\omega_0}{V_R} \approx \frac{\omega_{ce} \cos\theta_0}{V_R}. \tag{6}$$

The ion cyclotron resonance $k_{0x}=\omega_0/V_r$ closely, but not exactly, matches the computed dispersion for the LH pump wave. The next section shows that an idler wave is produced by the whistler parametric wave amplifier that is off the Lower Hybrid resonance (6) but will follow the same dispersion as shown in the numerical solutions of (5) discussed above.

Tracing out the LH wave frequency at the maximum growth rate gives the wavenumber dependence for the pump wave for a three of ion-ring densities relative to the background. The growth rate is strongly dependent on the ion-ring density fraction $\alpha$ in the ambient plasma. The spectrum of oblique Lower Hybrid waves available to support the whistler mode amplification, for example, is computed cover the frequency range from the local LH frequency (6.447 kHz) to over 500 kHz. As an illustrative value of the ion-ring density fraction, $\alpha=0.1$. The evolution of the ion velocity distribution in the plasma is understood with a kinetic mode using particle ions.

The ion-ring density fraction, $\alpha$, has effects two properties of the plasma. First, $\alpha$ must be large enough to drive oblique LH wave growth above damping by collisional and wave-wave interaction losses. The Lower Hybrid damping rate is given as $$\gamma_e = \frac{v_e}{2}\left(1 - \frac{\omega_{LH}^2}{\omega_0^2} + \frac{\omega_{LH}^2}{\omega_{ce}\omega_{ci}}\right) \cong v_e. \tag{7}$$

There is a wide frequency range of LH pump wave growth with different values of ion-ring density fraction. The instability is active over the entire spectrum because the growth rate is larger than the rate of electron-ion damping in the background plasma. That is, LF instability growth increases with the ring ion fraction and is always greater than the loss rate by electron-ion collisions for all pump wave frequencies. Second, off resonance, $\alpha$ changes the LH dispersion properties responsible for parametric wave frequency matching in the WPA. Initially, the plasma will be entirely composed of non-Maxwellian pickup ions but as energy is transferred to the Lower Hybrid pump waves, the ion velocity distribution will relax to a thermal distribution with both ambient and pickup ions. The particle generated Lower Hybrid waves will be amplifying whistler modes in a plasma with a non-Maxwellian distribution.

The saturation amplitudes and time histories of the LH waves cannot be obtained using linear theory. Kinetic particle in cell ("PIC") and hybrid (e.g., particle ions and fluid electron) codes permit running the models to equilibrium for estimation of the pump electric field amplitudes as a function of input kinetic energy from the pickup ions. These types of simulations have been reported for both electromagnetic and electrostatic fields with ion-ring velocity distributions as drivers. The energy density is computed assuming that the LH wave potential has the form $\phi_{0S}=A_{0S} e^{-i(\omega_0 t - k_{0x}x - k_{0z}z)}$ where $A_{0S}$ is the amplitude of the source potential. The results of a particle simulation model can provide energy density inside the fields as follows:

$$W_{rS} = \frac{\varepsilon_0 |A_{0S}(z)|^2}{4} F_{ES0}, \tag{8}$$

$$\text{where } F_{ES0} = k_{x0}^2\left(1 + \frac{\omega_{pi}^2}{\omega_0^2} + \frac{\omega_{pe}^2}{\omega_{ce}^2}\right) + k_z^2\left(\frac{\omega_{pe}^2}{\omega_0^2}\right)$$

This is then inserted into (3) to give the conversion efficiency from the neutral gas kinetic input to the REDA. For now, we will only investigate the REDA process as function of driving LH wave potential, not as a function of the rocket motor neutral density flux.

Generation of broadband Lower Hybrid waves with rocket exhaust is, for example, demonstrated by flying an electric field receiver though neutral gas plume in the topside ionosphere. For example, dedicated burns of the Orbital Maneuver Subsystem ("OMS") engines on the Space Shuttle produce a hypersonic exhaust cloud that intercepted the orbit of an AFLR C/NOFS satellite. Each OMS engine produced exhaust flow rates flow rate of 10 kg/s, which is 67 times larger than the Cygnus BT-4 flow rate of 0.15 kg/s.

For example, in situ measurements by the vector electric field instrument ("VEFI") on the showed 20 dB enhancements in electrostatic noise up to 4 kHz when the exhaust cloud passed over the C/NOFS satellite. In situ observations of the electric field oscillations from the 12-second OMS burn that traveled 87 km to the VEFI instrument on the C/NFOS satellite include a first wave that is a compressional Alfven or fast magnetohydrodynamic ("MHD") wave produced by bulk compression of the ionosphere by the engine burn. This wave propagates at the Alfven speed from the OMS engines reaches C/NOFS before the exhaust cloud. The large amplitude electric fields, 30 seconds after the start of the burn, are in situ electrostatic waves produced by streaming pickup ions driving ion-beam instabilities causing both Lower Hybrid and ion-acoustic emissions. The in situ Coupled Ion-Neutral Dynamics Investigation ("CINDI") probes on the C/NOFS satellite observed changes in composition, ion temperature, and ion velocity attributed to $CO_2^+$ ions produced by charge exchange with the supersonic spacecraft exhaust and collisional heating in the background atmosphere.

As another example, regarding the impact of a rocket engine burn on the plasma wave environment, a Radio Receiver Instrument/Enhanced Polar Outflow Probe ("RRI/e-POP") plasma wave receiver passed within 50 km of the Cygnus satellite. Before the burn, the RRI spectra showed a weak VLF signal at 19.8 kHz from the NWC transmitter 5000 km away in Australia, the Lower Hybrid cutoff for unducted whistlers near 6.8 kHz and a spacecraft induced LH wave signal near 17 kHz. There were no emissions in the 12 to 15 kHz band. Twenty seconds after the start of the 30-second burn, at the time of closest approach for the satellites, a broad spectrum of LH waves is observed in the RRI spectrum. This spectrum persisted for 20 seconds before returning to the pre-burn frequency display. A comparison of the computed exhaust density and the intensity of the exhaust induced LH turbulence shows a strong correlation. Intensity of the 19.8 kHz VLF signals is undisturbed by the high-speed injection of neutrals so there was no sign of whistler wave amplification.

In view of the above, it is believed that rocket exhaust excites oblique Lower Hybrid ("OLH") waves in the frequency range of 5 kHz to over 250 kHz. The growth rate of the LH instability is primarily affected by the fraction of energetic pickup ions relative to the total ion density. Consequently, the pump-wave, energy source is expected to be largest at the center of the exhaust plume where more ambient ions are converted into supersonic molecular exhaust ions. The transfer of energy from the pump to the whistler signal wave is dependent on the intensity of the rocket exhaust driven OLH waves. As the whistler propagates into the exhaust cloud, the rate of amplification will increases and will taper off as the wave exits the cloud with a fully amplified signal. The details of the amplification process inside the cloud are considered next.

Whistler Mode Parametric Amplification

The parametric amplification in a uniform plasma for the decay of a Lower Hybrid wave into a whistler and another Lower Hybrid wave is used to provide spatial growth of the whistler signal. Spatial parametric amplification in a plasma is not novel. For example, convective amplification by a three-wave parametric process has been investigated for the two electron plasma ("EP") waves produced by the two-plasmon decay instability for an electromagnetic ("EM") wave in an inhomogeneous plasma. Similarly, the EM wave decay into another EM wave and an IA wave has been shown to produce convective Brillouin amplification in a drifting plasma or the EM decay into an EM and EP wave produces convective Raman amplification in an inhomogeneous plasma. The whistler mode parametric amplifier follows a similar process with different pump and signal waves.

Figure 4:
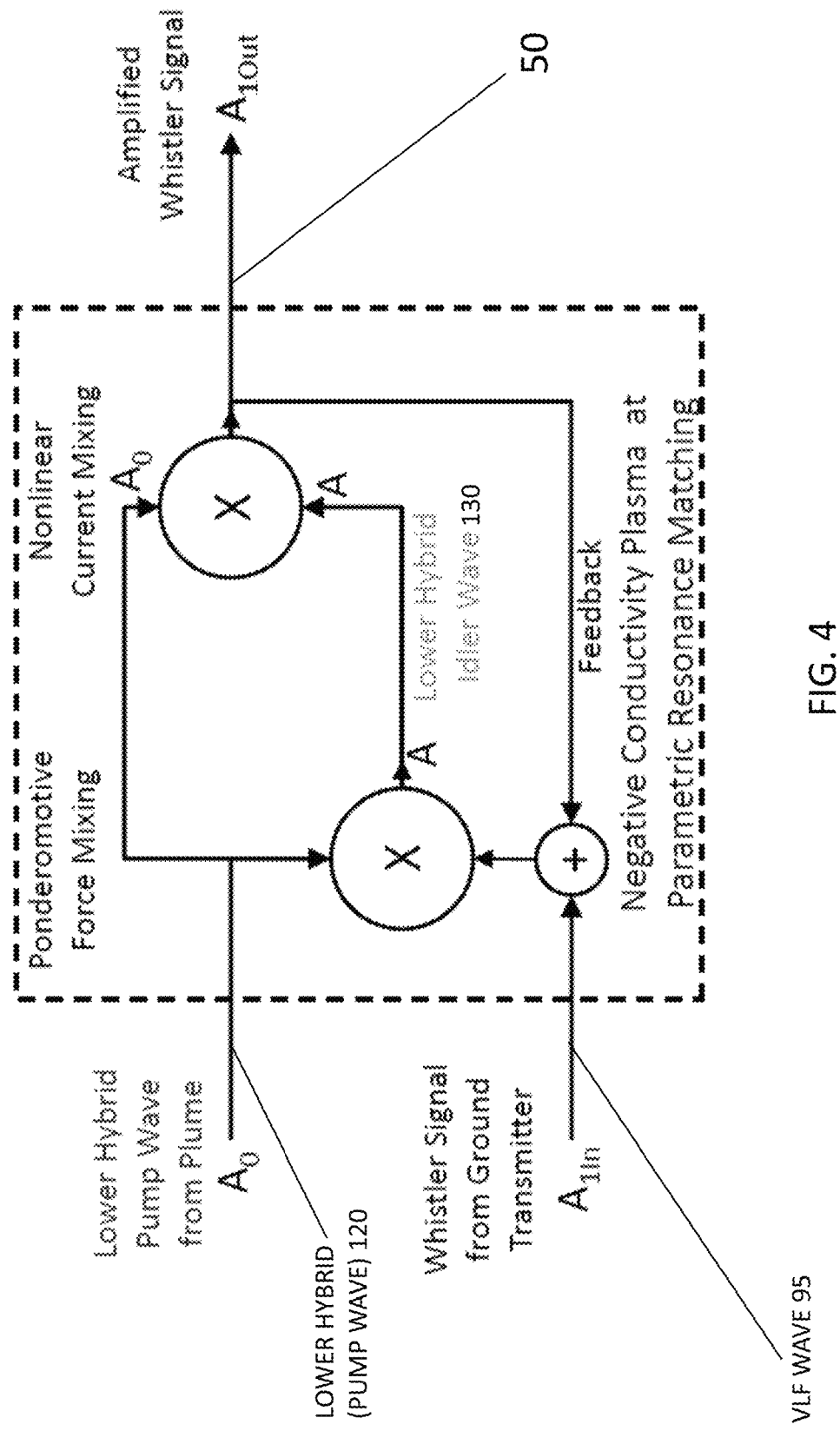
FIG. 4 is functional diagram of an embodiment of the instant invention.

A rocket burn produces the pump oblique-Lower Hybrid ("OLH") waves required for rocket exhaust driven amplification ("REDA"). The whistler traveling wave parametric amplifier ("WTWPA") comprises seven key features of temporal wave growth, spatial amplifier gain, bi-directionality, nonlinearity, feedback, phasing, and pump depletion. These features are illustrated in the functional diagram shown in FIG. 4. Without an input whistler signal, FIG. 4 represents that decay of a Lower Hybrid ("LH") pump signal $E_0$ into a whistler wave $E_{1Out}$ and a Lower Hybrid wave E. Since the LH turbulence produced by the rocket exhaust has a broad frequency range, the parametric decay without an input signal could yield a broad frequency range for whistler waves. With an input whistler signal, mixing with the Lower Hybrid pump yields a Lower Hybrid idler that extracts energy from the pump to produce coherent amplification of the whistler. At resonance, the phase matched feedback of the amplified signal leads to both spatial and temporal growth. A monochromatic whistler mode input $E_{1In}$ stimulates the conceptual circuit in FIG. 4 to operate at only one frequency $\omega_0$ with the decay given by the frequency matching relation $\omega_0=\omega_1+\omega$ the whistler and LH idler waves, respectively. This is the distinction between a broadband generation device and a monochromatic amplification device.

Temporal growth of whistlers in a plasma driven by a strong Lower Hybrid wave is described by P. Kumar and V. K. Tripathi, Parametric Conversion of a Lower Hybrid Wave into a Whistler in a Plasma, Phys. Plasmas, vol. 15, 052107 pp. 1-4, 2008, incorporated herein by reference. Any propagating wave passing through a medium of temporal growth will experience spatial amplification. The gain of the WTWPA depends on the strength of the LH pump and the spatial dimensions of the activated plasma region. The WTWPA is bi-directional because the amplification that occurs along the magnetic field lines is symmetric. The WTWPA employs the coupling between the pump wave at $\omega_0$, signal wave at $\omega_1$, and the idler wave at $\omega$. Second order, quadratic nonlinearities occur in plasmas because of the products of density and velocity in expressions for (a) plasma flux and current, (b) velocity and magnetic field in the expression for momentum, and (c) dual-frequency, velocity oscillations in the expression for plasma convection. The WTWPA system densities, velocities and fields have fluctuations at the three frequencies $\omega_0$, $\omega_1$, and $\omega$. The quadratic nonlinearities yields sums of these frequencies.

A theory underlying an embodiment of the invention is found in The Theory of Whistler Traveling Wave Parametric Amplification (WTWPA) Driven by an Ion Ring-Beam Distributions from a Neutral Gas Injection in Space Plasmas, IEEE TRANSACTIONS ON PLASMA SCIENCE, VOL. 49, NO. 6, JUNE 2021, incorporated herein by reference.

Rocket exhaust driven amplification ("REDA") of whistler mode waves in accordance with an embodiment of the instant invention is described, by way of example, in P. A. Bernhardt et al., "Strong amplification of ELF/VLF signals in space using neutral gas injections from a satellite rocket engine," in *Radio Science*, vol. 56, no. 2, pp. 1-18, February 2021, doi: 10.1029/2020RS007207, incorporated herein by reference.

Figure 3:
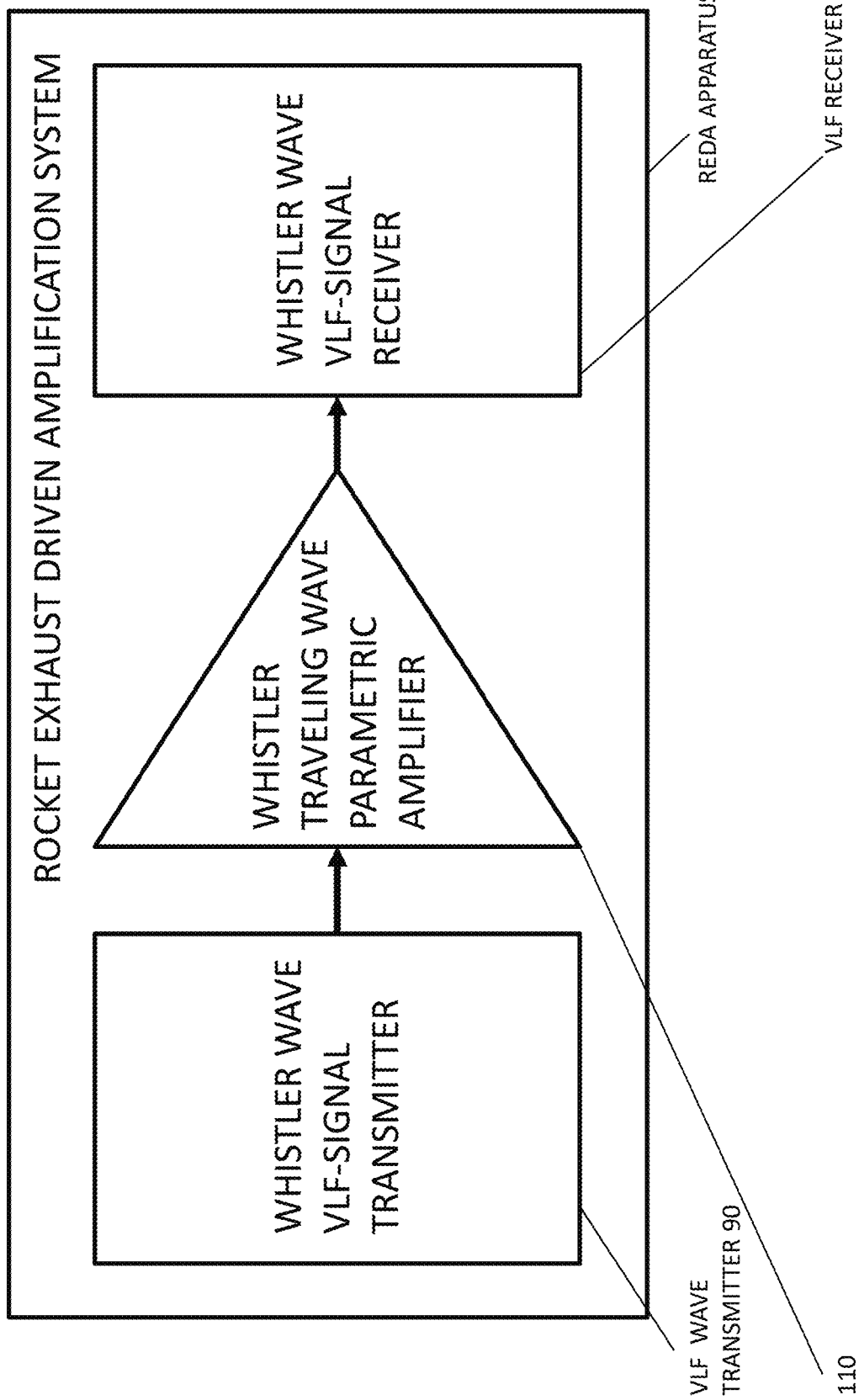
FIG. 3 is a schematic diagram of a communications system including an embodiment of the instant invention.

An embodiment of the invention includes a method of using a standard low earth orbit satellite in low earth orbit space including at least one standard. rocket engine to reduce a density of killer energetic protons or killer energetic electrons in a Van Allen radiation belt, (that is, one belt of the available Van Allen radiation belts). One of ordinary skill in the art will readily appreciate that all killer protons are energetic protons and that all killer electrons are energetic electrons. The method is described as follows with reference to FIGS. 2-4. A standard very low frequency ("VLF") wave 95 is transmitted into space using a standard VLF transmitter 90. The VLF wave is converted in space to an ambient wave 40. Ambient wave 40 is a term of art and, for the purpose of this patent application, means an unamplified wave; this unamplified wave is the VLF wave transmitted by the VLF transmitter, in the media, namely, space. The ambient wave acts as a signal wave for a Whistler traveling wave parametric amplifier 110. Rocket exhaust is generated by firing in atmospheric plasma the at least one rocket engine. The rocket exhaust includes a velocity substantially perpendicular to an earth magnetic field line. One of ordinary skill in the art will readily appreciate that Earth has more than one magnetic field line. Depending on where in the atmospheric plasma the at least one rocket engine is tired, the rocket exhaust must he substantially perpendicular to one of Earth's magnetic field lines. Additionally, one of ordinary skill in the art will readily appreciate that, with respect to the "substantially perpendicular" condition, as deviations from perpendicularity increase, parametric amplification of the ambient wave decreases. The rocket exhaust includes kinetic energy acting as a Lower Hybrid wave source. The Lower Hybrid wave source produces a Lower Hybrid wave. The Lower Hybrid wave acts as a pump wave 120 for the parametric amplifier. Nonlinear mixing of the signal wave and the pump wave in the atmospheric plasma simultaneously parametrically amplifies the ambient wave 40 and generates an idler wave 130 and a parametrically amplified wave 50 for the whistler traveling wave parametric amplifier 110. For the whistler traveling wave parametric amplifier 110, the Lower Hybrid, pump wave 120 has a frequency f0, the ambient wave 40 has a frequency f1, and the idler wave 130 has a frequency f2, the frequency f0 being equal to a sum of the frequency f1 and the frequency f2. The parametrically amplified wave 50 reduces the density of killer energetic protons or the killer energetic electrons in the Van Allen radiation belt.

One of ordinary skill in the art will readily appreciate that the Earth has two Van Allen radiation belts, although additional belts may be temporarily created. Depending on where in the atmospheric plasma the rocket engine is fired, density of killer energetic protons or density of killer energetic electrons is reduced in one of the two Van Allen radiation belts.

Optionally, the ambient wave includes an ambient electromagnetic ion cyclotron ("EMIC") wave and an ambient whistler-mode wave. One of ordinary skill in the art will readily appreciate that, in an embodiment of the invention, the "ambient whistler-mode wave" is the whistler-mode wave, transmitted by the VLF transmitter 90, in space. Likewise, one of ordinary skill in the art will readily appreciate that, in an embodiment of the invention, the "ambient EMIC wave" is the EMIC wave, transmitted by the VLF transmitter 90, in space.

A parametrically amplified whistler-mode wave according to an embodiment of the invention reduces killer energetic electrons in one of the Van Allen radiation belts, but not killer energetic protons. A parametrically amplified EMIC wave reduces killer energetic protons in one of the Van Allen radiation belts, but not killer energetic electrons.

Optionally, the VLF transmitter 90 includes a standard fixed VLF transmitter, a standard mobile VLF transmitter, a standard ground VLF transmitter, a standard aerial VLF transmitter, and/or a standard space-based VLF transmitter.

Optionally, the method further includes receiving the parametrically amplified wave using a standard VLF receiver 150, as shown by way of illustration in FIG. 4, thereby improving long range communications between the VLF transmitter 90 and the VLF receiver. Alternatively, an alternative embodiment of the invention includes a method, wherein the VLF receiver receives indirectly via reflection off an earth surface the parametrically amplified wave, thereby detecting natural or artificial underground structures in the earth surface. Optionally, the VLF receiver 150 includes a standard fixed VLF receiver, a standard mobile VLF receiver, a standard space-based VLF receiver, a standard ground VLF receiver, a standard aerial VLF receiver, and/or a standard underwater VLF receiver. In such an alternative method embodiment of the invention, the whistler wave is amplified at one hemisphere in the ionosphere. The wave is guided along field-aligned-ducts to the other hemisphere. This is called the geomagnetic conjugate location. For instance, a northern hemisphere source would be guided to the southern hemisphere. The amplified wave exits the ionosphere and propagates to the ground, where it penetrates to interact with sub-surface objects, e.g., metal deposits or voids, such as caves. For example, the intensified VLF wave makes detection and imaging easier down to a few electromagnetic skin depths of 100 m at 24 kHz.

Optionally, parametric amplification of the ambient wave by the nonlinear mixing of the ambient wave 40 (i.e., the signal wave) and the pump wave 120 in the atmospheric plasma is between about 30 dB and 50 dB. One of ordinary skill in the art will readily appreciate that, depending on the application, embodiments of the invention are optionally practiced within plus-or-minus 10% of this range and are still considered consistent with being about 30 dB and 50 dB.

Optionally, to achieve the parametric amplification between about 30 dB and 50 dB, generating rocket exhaust by firing in atmospheric plasma the at least one rocket engine includes increasing the velocity of the rocket exhaust; and/or increasing an amount of matter in the rocket exhaust. One of ordinary skill in the art will readily appreciate that increasing the amount of matter in the rocket exhaust may be accomplished in a number of different ways. For example, in an embodiment of the invention, a larger rocket engine is fired. In another embodiment of the invention, more than one rocket engine is fired.

Optionally, generating rocket exhaust by firing in atmospheric plasma the at least one rocket engine includes firing the at least one rocket engine at an altitude of about 400 to 600 kilometers above earth. One of ordinary skill in the art will readily appreciate that, depending on the application, embodiments of the invention are optionally practiced within plus-or-minus 10% of this range and are still considered consistent with being about 400 to 600 kilometers.

Another embodiment of the invention includes a REDA apparatus 160 and is described as follows with reference to FIGS. 1-4. The REDA apparatus 160 includes a standard very low frequency ("VLF") transmitter 90 transmitting a VLF wave 95 into space. The VLF wave is converted in space to an ambient wave 40. The ambient wave 40 acts as a signal wave for a whistler traveling wave parametric amplifier 110. The REDA apparatus 160 includes a standard low earth orbit satellite. The low earth orbit satellite includes at least one standard rocket engine. The at least one rocket engine includes a rocket engine nozzle 10. Through the rocket engine nozzle 10, the at least one rocket engine generates rocket exhaust in atmospheric plasma. The rocket exhaust includes a velocity substantially perpendicular to an earth magnetic field line. The rocket exhaust includes kinetic energy acting as a Lower Hybrid wave source. The Lower Hybrid wave source produces a Lower Hybrid wave. The Lower Hybrid wave acts as a pump wave 120 for the whistler traveling wave parametric amplifier 110. Nonlinear mixing of the ambient wave 40 (i.e., the signal wave) and the pump wave 120 in the atmospheric plasma simultaneously parametrically amplifies the ambient wave and generates an idler wave 130 and a parametrically amplified wave 50 for the whistler traveling wave parametric amplifier 110. For the whistler traveling wave parametric amplifier 110. the Lower Hybrid pump wave 120 includes a frequency f0, the ambient wave 40 includes a frequency f1, and the idler wave 130 includes a frequency f2, the frequency f0 being equal to a sum of the frequency f1 and the frequency f2. The parametrically amplified wave 50 reduces the density of killer energetic protons or the killer energetic electrons in a Van Allen radiation belt.

Optionally, the ambient wave comprises one of an ambient electromagnetic ion cyclotron ("EMIC") wave and an ambient whistler-mode wave. Optionally, the VLF transmitter 90 includes a standard fixed VLF transmitter, a standard mobile VLF transmitter, a standard ground VLF transmitter, a standard aerial VLF transmitter, and/or a standard space-based VLF transmitter. Optionally, the REDA apparatus 160 further includes a standard VLF receiver 150 receiving the parametrically amplified wave, thereby improving long-range communications between the VLF transmitter 90 and the VLF receiver. Optionally, the VLF receiver 150 includes a standard fixed VLF receiver, a standard mobile VLF receiver, a standard space-based VLF receiver, a standard ground VLF receiver, and/or a standard underwater VLF receiver.

Figure 5A:
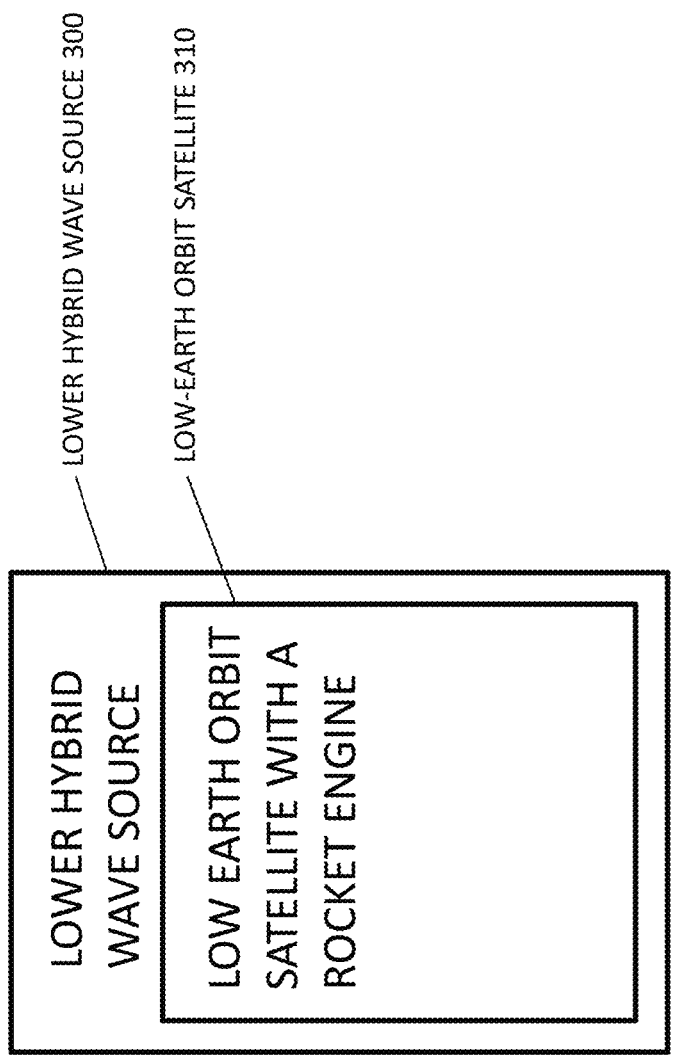
FIG. 5A is a block diagram of a Lower Hybrid wave source according to an embodiment of the instant invention as implemented as a standard low earth orbit satellite with at least one rocket engine generating rocket exhaust.
Figure 5B:
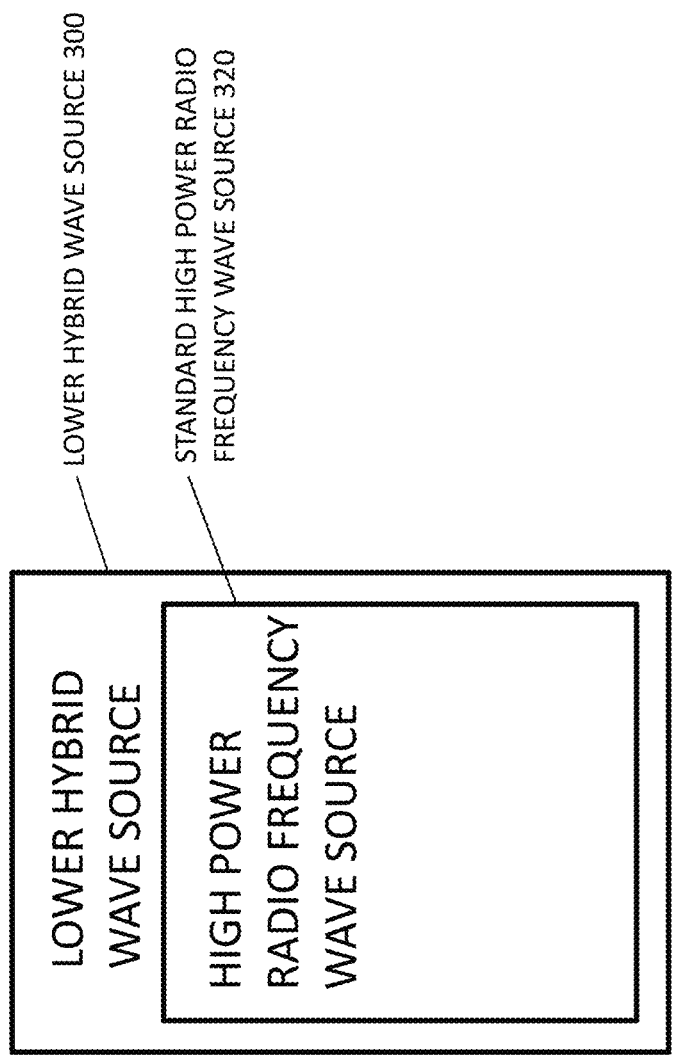
FIG. 5B is a block diagram of a Lower Hybrid wave source according to an embodiment of the instant invention as implemented as a standard high power radio frequency wave source.
Figure 5C:
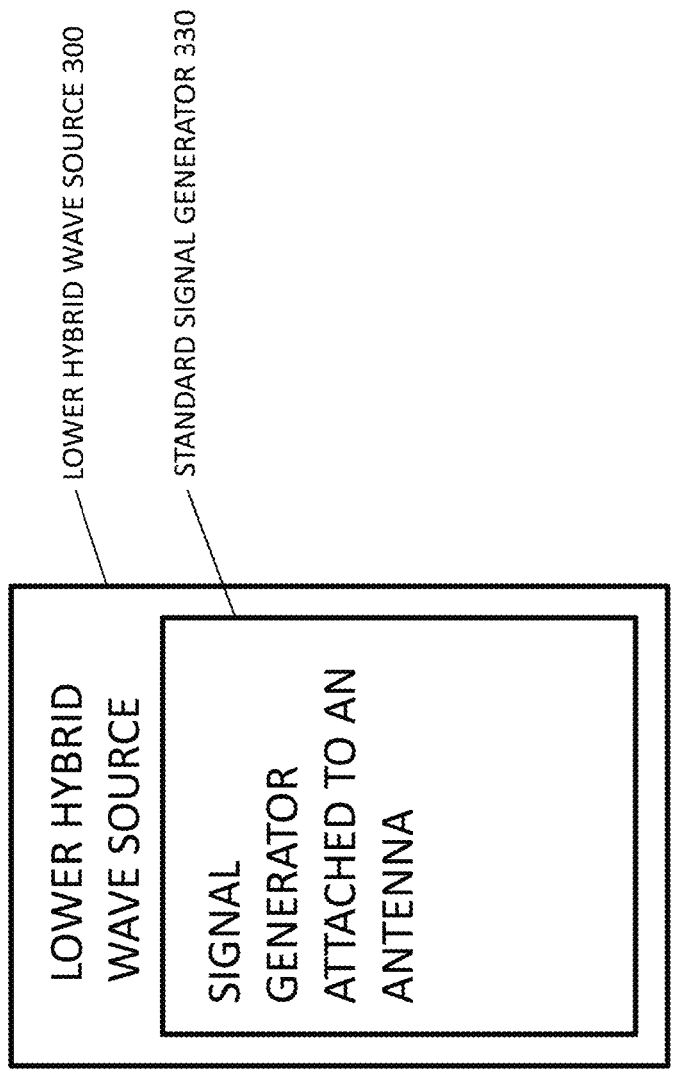
FIG. 5C is a block diagram of a Lower Hybrid wave source according to an embodiment of the instant invention as implemented as a standard electronic signal generator that drives a standard antenna.

Whistler traveling wave parametric amplifiers according to various embodiments of the instant invention employ Lower Hybrid waves. Different LH wave sources are selected to match respective applications. Lower Hybrid wave sources 300, such as shown by way of illustration in FIGS. 5A-5C, include standard low earth orbit satellites 310 with at least one rocket engine generating rocket exhaust, standard high power radio frequency wave sources 320, and standard electronic signal generators 330 that drives an antenna. Whistler traveling wave parametric amplifiers according to various embodiments of the instant invention are also found in a plasma imbedded in a linear magnetic field. The whistler traveling wave parametric amplifier remains constant with a LH wave pump, a whistler wave signal, and a LH wave idler. Rocket exhaust from a low earth orbit satellite 310 makes Lower Hybrid waves by ion-molecule charge exchange of energetic molecules with ambient oxygen ions. However, in alternative embodiments of the invention, Lower Hybrid waves are generated by non-rocket-exhaust Lower Hybrid sources. For example, in an alternative embodiment of the invention, high power radio waves from a standard high frequency ("HF") radio wave source 320 in the plasma make Lower Hybrid waves by energetic electromagnetic wave conversion to Upper Hybrid waves, which decay into another Upper Hybrid wave and the Lower Hybrid wave. High power radio sources at HF band (i.e., 3 to 30 MHz) frequencies are reflected in the ionosphere. Just below the reflection point, the HF frequency equals the local Lower Hybrid frequency, which is numerically the square-root of the sum of the squares of the electron plasma frequency and the electron cyclotron frequency in the plasma. At this point, the high power HF wave is converted into a high power upper hybrid wave, which decays into another Upper Hybrid wave and the required Lower Hybrid wave. The high power HF wave needs a power range of, for example, 50 Mega Watt to 3000 Mega Watt effective radiated power ("ERP"). The high power HF wave, for example, can be produced by a standard 50 kilo Watt to 3 Mega Watt transmitter and a standard antenna with a gain of 1000. The HF radio frequency must reflect in the ionosphere and is typically from 3 to 10 MHz. As another example, in an alternative embodiment of the invention, a standard signal generator 330 attached to a standard antenna in the plasma directly produces Lower Hybrid waves. For example, the VLF signal generator and the antenna are both usually in the ionosphere above 300 km altitude.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Letters Patent of the United States is:

1. A method of using at least one Lower Hybrid wave source in atmospheric plasma to reduce a density of one of killer energetic protons and killer energetic electrons in a Van Allen radiation belt, the method comprising:
   transmitting into space a very low frequency (VLF) wave using a VLF transmitter, the VLF wave being converted in space to an ambient wave, the ambient wave acting as a signal wave for a parametric amplifier; and
   generating a Lower Hybrid wave in the atmospheric plasma using the at least one Lower Hybrid wave source, the Lower Hybrid wave acting as a pump wave for the parametric amplifier,
   wherein nonlinear mixing of the signal wave and the pump wave in the atmospheric plasma simultaneously parametrically amplifies the ambient wave and generates an idler wave for the parametric amplifier and a parametrically amplified wave,
   wherein, for the parametric amplifier, the pump wave comprises a frequency $f_0$, the ambient wave comprises a frequency $f_1$, and the idler wave comprises a frequency $f_2$, the frequency $f_0$ being equal to a sum of the frequency $f_1$; and the frequency f2,
   wherein the parametrically amplified wave reduces the density of one of the killer energetic protons and the killer energetic electrons in the Van Allen radiation belt,
   wherein the method further comprises one of:
   receiving directly the parametrically amplified wave using a VLF receiver, thereby improving long range communications between the VLF transmitter and the VLF receiver; and
   receiving indirectly via reflection off an earth surface the parametrically amplified wave using the VLF receiver, thereby detecting underground structures.

2. The method according to claim 1, wherein the Lower Hybrid wave source comprises one of:
   a low earth orbit satellite comprising at least one rocket engine, the at least one rocket engine generating rocket exhaust in the atmospheric plasma, the rocket exhaust including a velocity substantially perpendicular to an earth magnetic field line, the rocket exhaust including kinetic energy acting as the Lower Hybrid wave source,
   a high power radio frequency wave source in the atmospheric plasma, and
   a signal generator attached to an antenna in the atmospheric plasma.

3. The method according to claim 1, wherein the ambient wave comprises one of an ambient electromagnetic ion cyclotron (EMIC) wave and an ambient whistler-mode wave.

4. The method according to claim 1, wherein the VLF transmitter comprises at least one of a fixed VLF transmitter, a mobile VLF transmitter, a ground VLF transmitter, an aerial VLF transmitter, and a space-based VLF transmitter.

5. The method according to claim 1, wherein the VLF receiver comprises at least one of a fixed VLF receiver, a mobile VLF receiver, a space-based VLF receiver, a ground VLF receiver, an aerial VLF receiver, and an underwater VLF receiver.

6. The method according to claim 1, wherein parametric amplification of the ambient wave by the nonlinear mixing of the signal wave and the pump wave in the atmospheric plasma is between about 30 dB and 50 dB.

7. The method of claim 6, wherein, achieving the parametric amplification between about 30 dB and 50 dB comprises at least one rocket engine generating rocket exhaust, wherein the generating rocket exhaust comprises firing in atmospheric plasma the at least one rocket engine by at least one of:
   increasing velocity of the rocket exhaust; and
   increasing an amount of matter in the rocket exhaust.

8. The method according to claim 2, wherein generating rocket exhaust comprises firing in atmospheric plasma the at least one rocket engine, said firing in the atmospheric plasma the at least one rocket engine comprising firing the at least one rocket engine at an altitude of about 400 to 600 kilometers above earth.

9. An apparatus comprising:
   a very low frequency (VLF) transmitter transmitting a VLF wave into space, the VLF wave being converted in space to an ambient wave, the ambient wave acting as a signal wave for a parametric amplifier;
   a Lower Hybrid wave source generating a Lower Hybrid wave in the atmospheric plasma, the Lower Hybrid wave acting as a pump wave for the parametric amplifier;
   wherein nonlinear mixing of the signal wave and the pump wave in an atmospheric plasma simultaneously parametrically amplifies the ambient wave and generates an idler wave for the parametric amplifier and a parametrically amplified wave,
   wherein, for the parametric amplifier, the pump wave comprises a frequency $f_0$, the ambient wave comprises a frequency $f_1$, and the idler wave comprises a frequency $f_2$, the frequency $f_0$ being equal to a sum of the frequency $f_1$ and the frequency $f_2$,
   wherein the parametrically amplified wave reduces a density of one of killer energetic protons and killer energetic electrons in a Van Allen radiation belt,
   the apparatus further comprising a VLF receiver receiving the parametrically amplified wave, thereby improving long-range communications between said VLF transmitter and said VLF receiver.

10. The apparatus according to claim 9, wherein the ambient wave comprises one of an ambient electromagnetic ion cyclotron (EMIC) wave and an ambient whistler-mode wave.

11. The apparatus according to claim 9, wherein the VLF transmitter comprises at least one of a fixed VLF transmitter, a mobile VLF transmitter, a ground VLF transmitter, an aerial VLF transmitter, and a space-based VLF transmitter.

12. The apparatus according to 9, wherein said VLF receiver comprises at least one of a fixed VLF receiver, a mobile VLF receiver, a space-based VLF receiver, a ground VLF receiver, and an underwater VLF receiver.

13. The apparatus according to claim 9, wherein said Lower Hybrid wave source comprises one of:
- a low earth orbit satellite comprising at least one rocket engine, said at least one rocket engine generating rocket exhaust in the atmospheric plasma, the rocket exhaust including a velocity substantially perpendicular to an earth magnetic field line, the rocket exhaust including kinetic energy acting as the Lower Hybrid wave source,
- a high power radio frequency wave source in the atmospheric plasma, and a signal generator attached to an antenna in the atmospheric plasma.

* * * * *